L. VAN GILDER.
PIPE REPAIR DEVICE.
APPLICATION FILED OCT. 30, 1911.

1,097,151. Patented May 19, 1914.

Witnesses:—
William F. Nase
Willa A. Burrows

Inventor:—
Lincoln Van Gilder.
by his Attorneys:—
Howson & Howson

UNITED STATES PATENT OFFICE.

LINCOLN VAN GILDER, OF VENTNOR, NEW JERSEY.

PIPE-REPAIR DEVICE.

1,097,151. Specification of Letters Patent. Patented May 19, 1914.

Application filed October 30, 1911. Serial No. 657,661.

*To all whom it may concern:*

Be it known that I, LINCOLN VAN GILDER, a citizen of the United States, residing in Ventnor, New Jersey, have invented certain Improvements in Pipe-Repair Devices, of which the following is a specification.

One object of my invention is to provide a device or combination of parts, particularly adapted for the repair of large size conduits such as wooden, steel or iron pipes; it being especially desired that the device shall be of such construction that may be easily and conveniently transported, that it shall be capable of being quickly and conveniently applied to a pipe or conduit to stop a leak therein, that it shall be relatively inexpensive, and finally that it shall be capable of application to a leaky conduit without requiring that said conduit be put out of service or the liquid be drawn off from the same.

Another object of my invention is to provide a pipe repair device which shall not only be relatively inexpensive to make and apply, but which shall consist of parts comparatively easy to make or obtain.

These objects and other advantageous ends I secure as hereinafter set forth; reference being had to the accompanying drawings, in which:—

Figure 1:
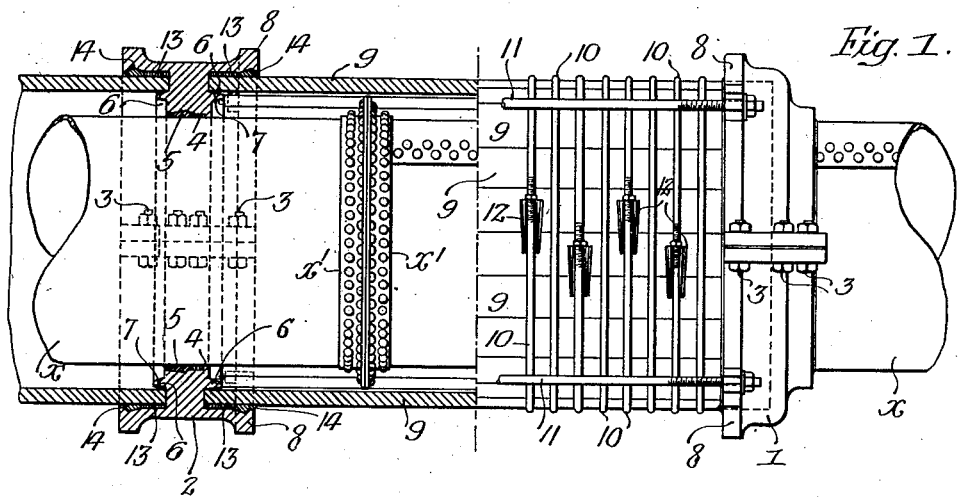
Figure 2:
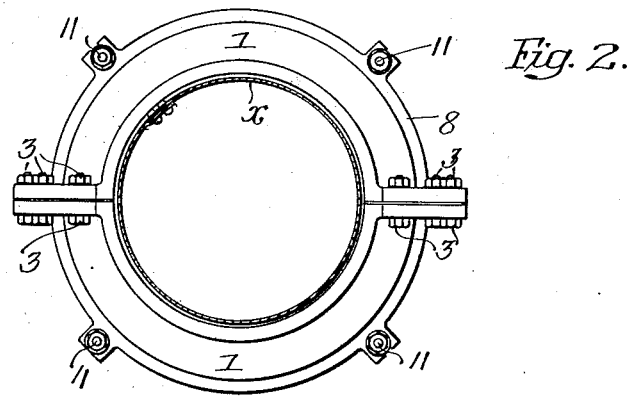
Figure 3:
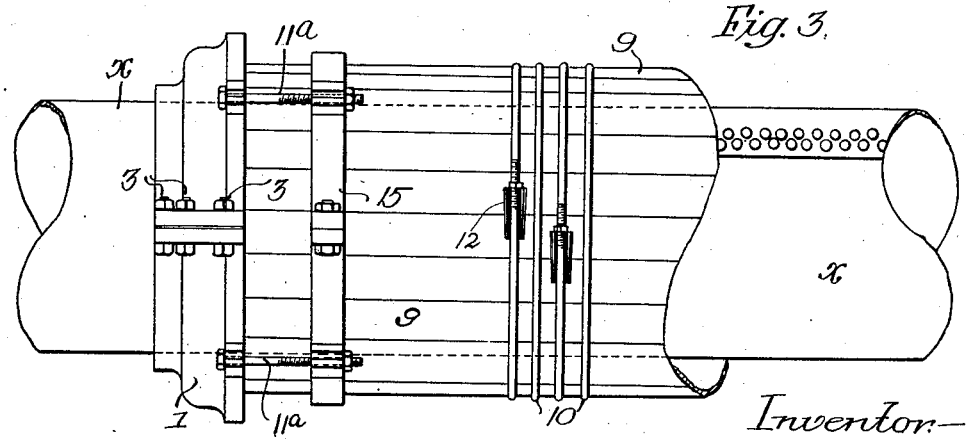

Figure 1, is a side elevation of a conduit illustrating my invention as applied thereto for the purpose of stopping a leak or a break, the view illustrating the repair device as partly in section; Fig. 2, is a transverse section of the conduit, illustrating my invention in end elevation; and Fig. 3, is a side elevation of a conduit illustrating a form of the invention in which relatively short tie bolts may be employed.

In the above drawings, X represents a section of the riveted steel pipe or conduit which is illustrated as having its lengths connected by flanged collars X' riveted together in the well known manner.

In the event of a leak occurring in such a conduit I apply to it my repair device which consists essentially of two bells 1 and 2 made in any number of separable sections connected together by bolts 3 and mounted on the pipe or conduit X at a distance from each other depending upon the length of the conduit which is leaking. For the purpose of making liquid-proof joints between the conduit and each bell, I place packing between said parts consisting in the present case, of a body of jute 4 and a mass of lead 5, which is applied in the manner well understood in this art and afterward calked. Each of the bells is made with an interior annular rib 6 so placed as to form an annular recess whose wall nearest the conduit is inclined as indicated at 7; it being noted that the edge or mouth of the bell extends some distance beyond said rib.

Extending between the bells and into the recesses formed by their ribs 6 and their mouth portions 8, is a body of staves 9 of suitable length and material, whose ends rest upon the inclined portions 7 of the ribs 6 and which are held in the form of a cylindrical conduit by adjustable hoops or bands 10, as shown. It will be noted that the ribs 6 are so placed as to support the staves 9 at such a distance from the conduit as will permit them to pass over the flanges of the collars X' without touching them.

The two bells are connected to each other by any desired number of longitudinally extending tie rods 11, which engage suitable lugs formed in the present instance on the peripheries of their mouth portions 8, although it is obvious that said bolts may be connected to the bells in any suitable manner without departing from my invention.

In applying my repair device to a length of pipe, the bells are clamped thereto by the bolts 3, at such distances from each other as will include between them that portion of the pipe having the leak or break which it is desired to stop. Said bells are packed to the pipe or conduit by the use of jute and lead, as shown, after the staves have been loosely mounted in the position shown so as to extend between the bells and rest upon the annular ribs 6. The bands 10 are then loosely applied around the staves and the tie rods 11 are made to connect the two bells in order to prevent their movement upon the conduit away from each other. The adjusting turnbuckles or nuts 12, on the stave bands 10, are then tightened so as to draw said staves into a tight cylindrical container and it is obvious that for this purpose their end portions compress sufficiently to permit of the complete closure of the spaces between them. By means of suitable packing, such as jute, introduced between the ends of the staves and the mouth portions 8 of the bells, as indicated at 13, practically all of the leakage of liquid is stopped and, finally, melted lead, or other suitable packing 14, is placed between the staves and the outer portion of the mouth 8. By this means it is possible to repair a conduit of practically any size, even while it is in service carrying liquid under high pressure and I have found that under these conditions it is possible to successfully apply and calk the various packings as shown, using melted lead in the customary manner.

The invention is particularly applicable to cast iron pipes which frequently develop longitudinally extending cracks and if the distance between the two bells be such that the tie rods 11 become abnormally long, I may, as shown in Fig. 3, apply to the staves a sectional clamping ring or collar 15, thereafter extending relatively short tie rods 11ª between it and the bell to which it is adjacent.

If it should be found necessary to stop a leak occurring just beyond and outside one of the bells, that form of bell shown at 2 may be employed. This latter is of a double mouthed form i. e. it is formed to receive staves 9 in either face, so that the repair device may be continued indefinitely by the use of bells of this form, or, if but a small and localized leak occurs, a single bell 1, with a set of relatively short staves, may be used with the device previously applied, as shown.

I claim:

1. A pipe repair device consisting of two sectional bell-mouthed members mounted on a conduit and structurally independent thereof; means for forming a fluid tight joint between each of said members and the conduit; a tubular structure surrounding the conduit but spaced away from the same in position for its ends to respectively enter the two bell-mouthed members; and means for holding said members together.

2. A pipe repair device consisting of two bell-mouthed members, each having an internal annular rib; means for forming a fluid tight joint between each of said members and the conduit; a tubular structure of a diameter to enter the bell-mouthed members and rest upon said rib; and means for holding the bell-mouthed members together.

3. A pipe repair device consisting of two members capable of being mounted on a conduit and each providing an annular recess; means for forming a fluid tight joint between each of said members and the conduit; a series of staves arranged in tubular form around the conduit; the ends of said staves entering the annular recesses of said members; annular structures surrounding the staves for holding them together; and tie rods connecting the bell-mouthed members.

4. A pipe repair device consisting of a plurality of bell-mouthed structures mounted on a conduit; a tubular structure extending around the conduit and fitting each of said bell-mouthed structures; a collar mounted on the tubular structure; and tie bolts between said collar and one of the bell-mouthed structures for preventing its movement upon the conduit.

In testimony whereof, I have signed my name to this specification, in the presence of two subscribing witnesses.

LINCOLN VAN GILDER.

Witnesses:
 FRANK P. WRIGHT,
 RANDOLPH S. YOUNG.

Copies of this patent may be obtained for five cents each, by addressing the "Commissioner of Patents, Washington, D. C."